(12) United States Patent
Tung

(10) Patent No.: US 10,728,084 B2
(45) Date of Patent: Jul. 28, 2020

(54) VIRTUALIZED RACK MANAGEMENT MODULES

(71) Applicant: Quanta Computer Inc., Taoyuan (TW)

(72) Inventor: Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 951 days.

(21) Appl. No.: 15/096,032

(22) Filed: Apr. 11, 2016

(65) Prior Publication Data

US 2017/0295053 A1   Oct. 12, 2017

(51) Int. Cl.

| | | |
|---|---|---|
| *G06F 9/44* | (2018.01) | |
| *G06F 9/455* | (2018.01) | |
| *H04L 12/24* | (2006.01) | |
| *H04L 29/08* | (2006.01) | |
| *H04L 12/46* | (2006.01) | |
| *H04L 12/751* | (2013.01) | |
| *G06F 15/16* | (2006.01) | |
| *G06F 9/50* | (2006.01) | |

(52) U.S. Cl.
CPC .......... *H04L 41/042* (2013.01); *G06F 9/5077* (2013.01); *G06F 15/161* (2013.01); *H04L 45/02* (2013.01); *H04L 12/4641* (2013.01); *H04L 12/4675* (2013.01)

(58) Field of Classification Search
None
See application file for complete search history.

(56) References Cited

U.S. PATENT DOCUMENTS

| | | | |
|---|---|---|---|
| 10,083,026 B1 * | 9/2018 | Venkata | ............... G06F 8/65 |
| 2012/0110164 A1 | 5/2012 | Frey et al. | |
| 2013/0238802 A1 | 9/2013 | Sarikaya | |
| 2014/0259015 A1 | 9/2014 | Chigusa et al. | |
| 2014/0277807 A1 | 9/2014 | Mick et al. | |

(Continued)

FOREIGN PATENT DOCUMENTS

| | | |
|---|---|---|
| TW | 201519607 A | 5/2015 |
| WO | 2012023183 A1 | 2/2012 |

OTHER PUBLICATIONS

JP Office Action for Application No. 2017-045835, dated Aug. 21, 2018, w/ First Office Action Summary.

(Continued)

*Primary Examiner* — Nicholas R Taylor
*Assistant Examiner* — Ho T Shiu
(74) *Attorney, Agent, or Firm* — Nixon Peabody LLP

(57) ABSTRACT

Systems, methods, and computer-readable media for managing nodes through virtual rack management modules. A system can have a first rack that includes a first top-of-rack (ToR) switch and a first group of nodes. The first ToR switch can be connected to the first group of nodes. The system can also have a second rack that includes a second ToR switch and a second group of nodes. The second ToR switch can be connected to the second group of nodes, and the second ToR switch can be connected to the first ToR switch. Furthermore, the system can include a rack management node that executes a hypervisor. The hypervisor can run a first virtual rack management module (vRMM) and a second vRMM. The first vRMM and the second vRMM can manage the first group of nodes and the second group of nodes, respectively.

19 Claims, 7 Drawing Sheets

400

| TOR SWITCH (402) | ADDRESS (404) | vRMM (406) |
|---|---|---|
| 1 | 192.168.1.1 | 1 |
| 2 | 192.168.1.2 | 8 |
| 3 | 192.168.1.15 | UNREGISTERED |
| 4 | 192.168.1.22 | 4 |
| 5 | 192.168.1.5 | UNREGISTERED |

(56) References Cited

U.S. PATENT DOCUMENTS

| | | | |
|---|---|---|---|
| 2014/0351812 A1* | 11/2014 | Imai | G06F 9/45533 |
| | | | 718/1 |
| 2015/0109923 A1* | 4/2015 | Hwang | H04L 47/12 |
| | | | 370/235 |
| 2015/0277972 A1 | 10/2015 | Xu et al. | |
| 2016/0014039 A1 | 1/2016 | Reddy et al. | |
| 2016/0014073 A1* | 1/2016 | Reddy | H04L 67/38 |
| | | | 713/2 |
| 2016/0021019 A1 | 1/2016 | Parikh et al. | |
| 2017/0289256 A1* | 10/2017 | Kumar | H04L 67/125 |

OTHER PUBLICATIONS

Extended European Search Report for EP Application No. 17160746.8, dated Sep. 14, 2017, w/ Search Report Summary.

Taiwanese Office Action for Application No. 105118391, dated Sep. 19, 2017, w/ First Office Action Summary.

\* cited by examiner

| TOR SWITCH | ADDRESS | vRMM |
|---|---|---|
| 1 | 192.168.1.1 | 1 |
| 2 | 192.168.1.2 | 8 |
| 3 | 192.168.1.15 | UNREGISTERED |
| 4 | 192.168.1.22 | 4 |
| 5 | 192.168.1.5 | UNREGISTERED |

| NODE | HOST IP | BMC IP ADDRESS | LOCATION |
|---|---|---|---|
| 1 | 192.168.1.100 | 10.2.2.1 | 1 |
| 2 | 192.168.1.122 | 10.2.2.2 | 2 |
| 3 | 192.168.1.114 | 10.2.2.16 | 5 |
| ... | ... | ... | ... |
| 12 | 192.168.1.183 | 10.2.2.9 | 11 |

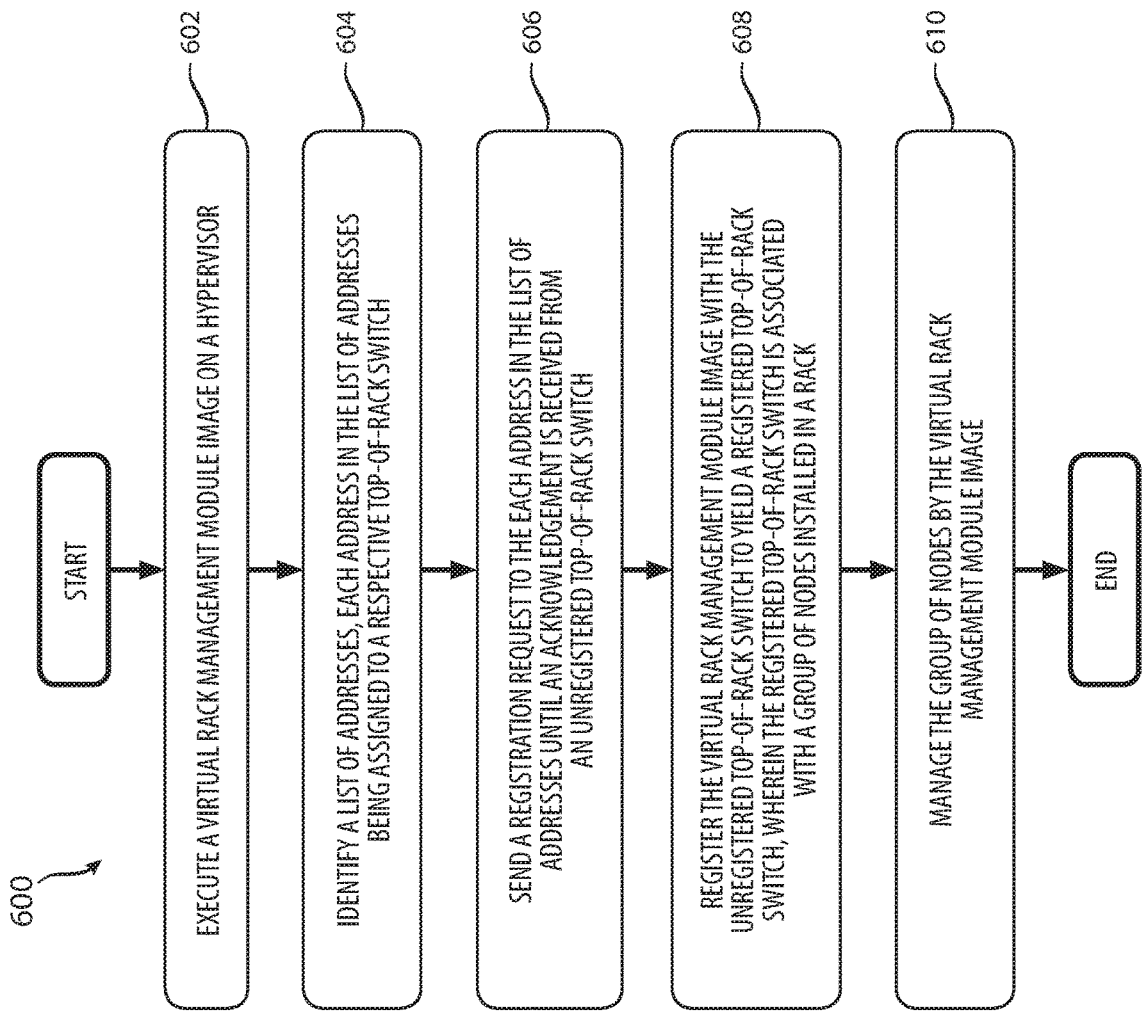

VIRTUALIZED RACK MANAGEMENT MODULES

BACKGROUND

In data centers, various servers and network devices are mounted on one or more server racks to make their deployment and adjustment more convenient and manageable. Each node installed in a rack can be hooked up to a top-of-rack (ToR) switch installed inside the same rack (usually at the top of the rack) and, in turn, be managed by a rack management module. The rack management module is typically also installed inside the rack and it is tasked with the management of all the nodes in the rack.

However, having a rack management module in every rack can be costly because the rack management module takes up extra space, draws more power, and requires additional cabling. This can be especially problematic as the data center grows in size and the racks increase in number. As more racks are added to the data center, the same number of rack management modules may also have to be instantiated, installed, and maintained. Therefore, there exists a need for an improved architecture for managing racks and ToR switches.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage devices for utilizing virtual rack management modules. In some embodiments, the system can have a first rack that includes a first top-of-rack switch and a first group of nodes. The first top-of-rack switch can be connected to the first group of nodes via a network. The system can also have a second rack that includes a second top-of-rack switch and a second group of nodes. The second top-of-rack switch can be connected to the second group of nodes via the network, and the second top-of-rack switch can also be connected to the first top-of-rack switch via the network. The system can include a rack management node that executes a hypervisor, where the hypervisor runs a first virtual rack management module and a second virtual rack management module. The first virtual rack management module can manage the first group of nodes of the first rack via the network. Similarly, the second virtual rack management module can manage the second group of nodes of the second rack via the network.

The hypervisor can run additional virtual rack management modules that manage additional racks and additional groups of nodes. The rack management node can be a rack mount server mounted on one of the racks, and thereby alleviating the needs of the remaining racks to have their own rack management modules physically mounted in them. The virtual rack management modules can be configured to retrieve a list of Internet Protocol (IP) addresses from their respective top-of-rack switches, where each IP address in the list of IP addresses is associated with a corresponding node. The IP addresses can be baseboard management controller (BMC) IP addresses. The virtual rack management modules can also be configured to retrieve a list of locations from the top-of-rack switches, where each location in the list of locations is associated with a corresponding node. The nodes may include servers, computers, network devices, etc. The system can also include a list of mappings between virtual rack management modules, running on the hypervisor, and the groups of nodes. The virtual rack management modules can retrieve and/or update this list of mappings.

BRIEF DESCRIPTION OF THE DRAWINGS

Various embodiments in accordance with the present disclosure will be described with reference to the drawings, in which:

FIG. 4 shows an example mapping table for rack management modules;

FIG. 5 shows an example table for rack management information; and

FIG. 6 shows an example method embodiment for registering a virtual rack management module.

DETAILED DESCRIPTION

Figure 1:
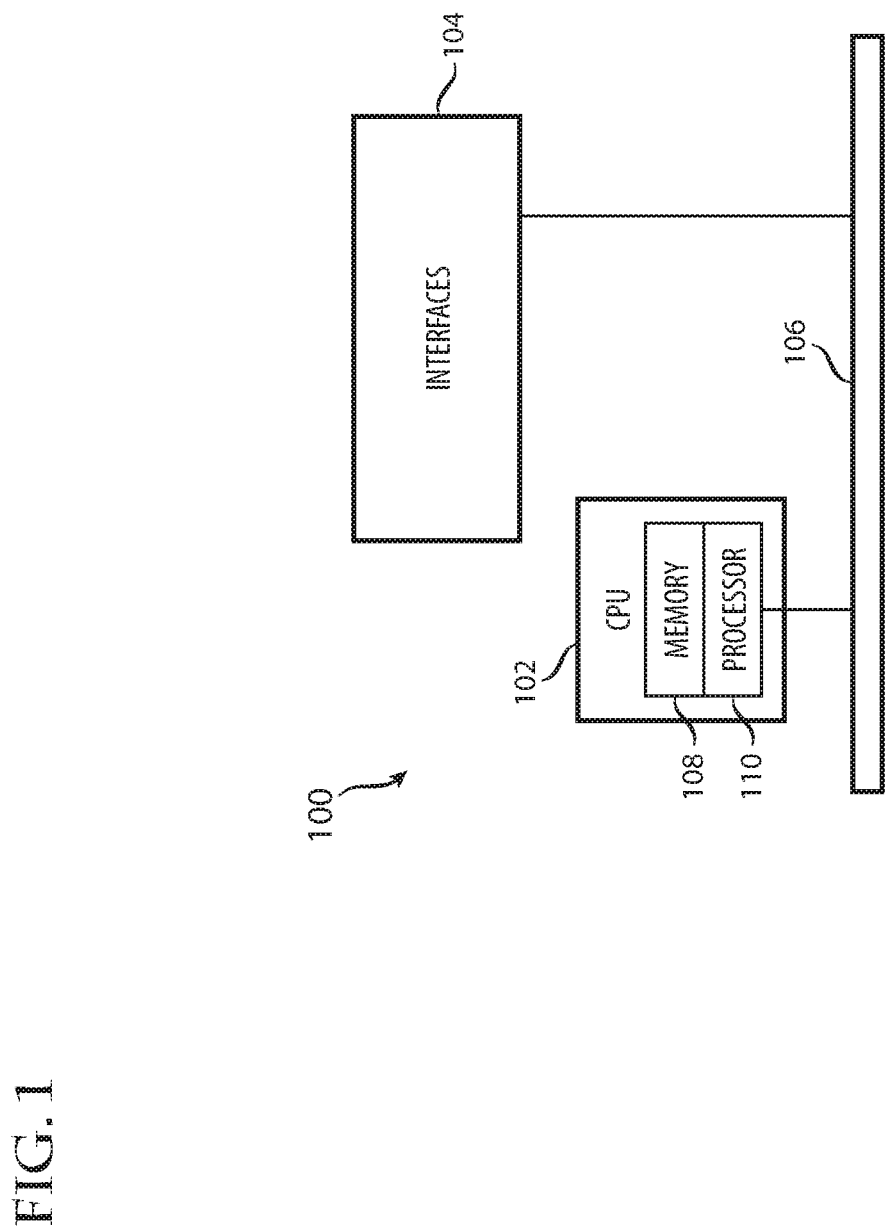
FIG. 1 shows an example computing device according to some aspects of the subject technology.
Figure 2A:
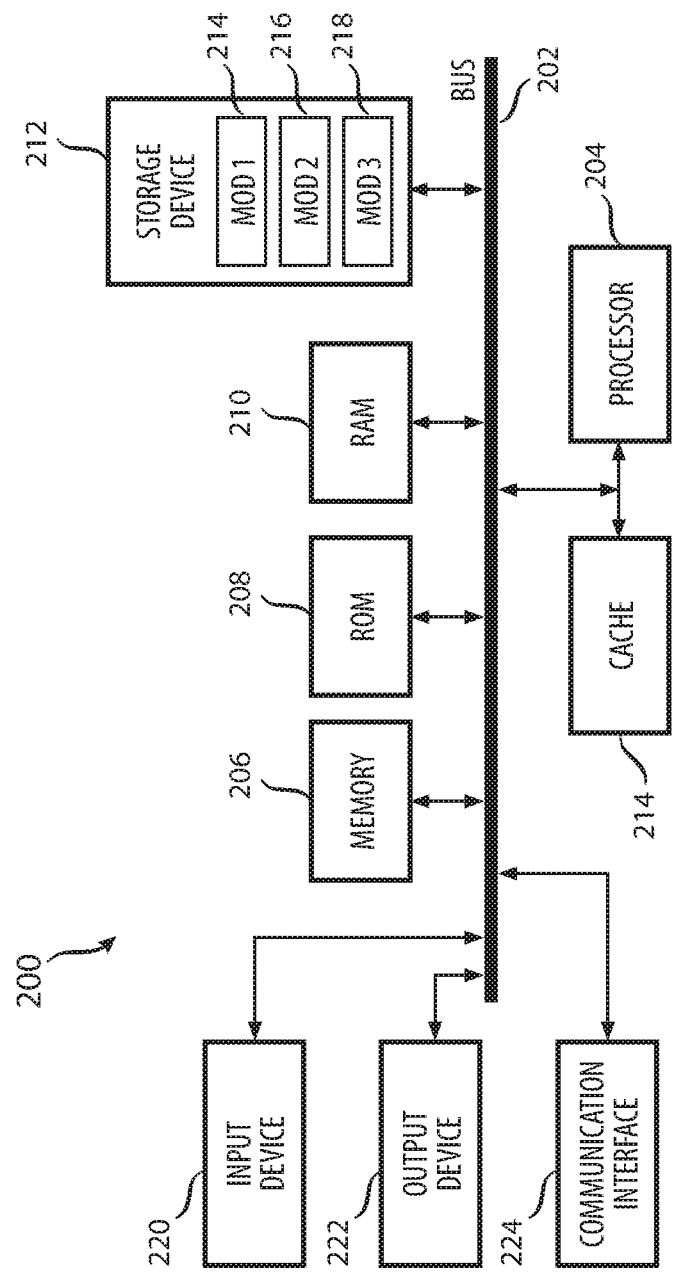
FIGS. 2A and 2B show example system embodiments according to some aspects of the subject technology.
Figure 2B:
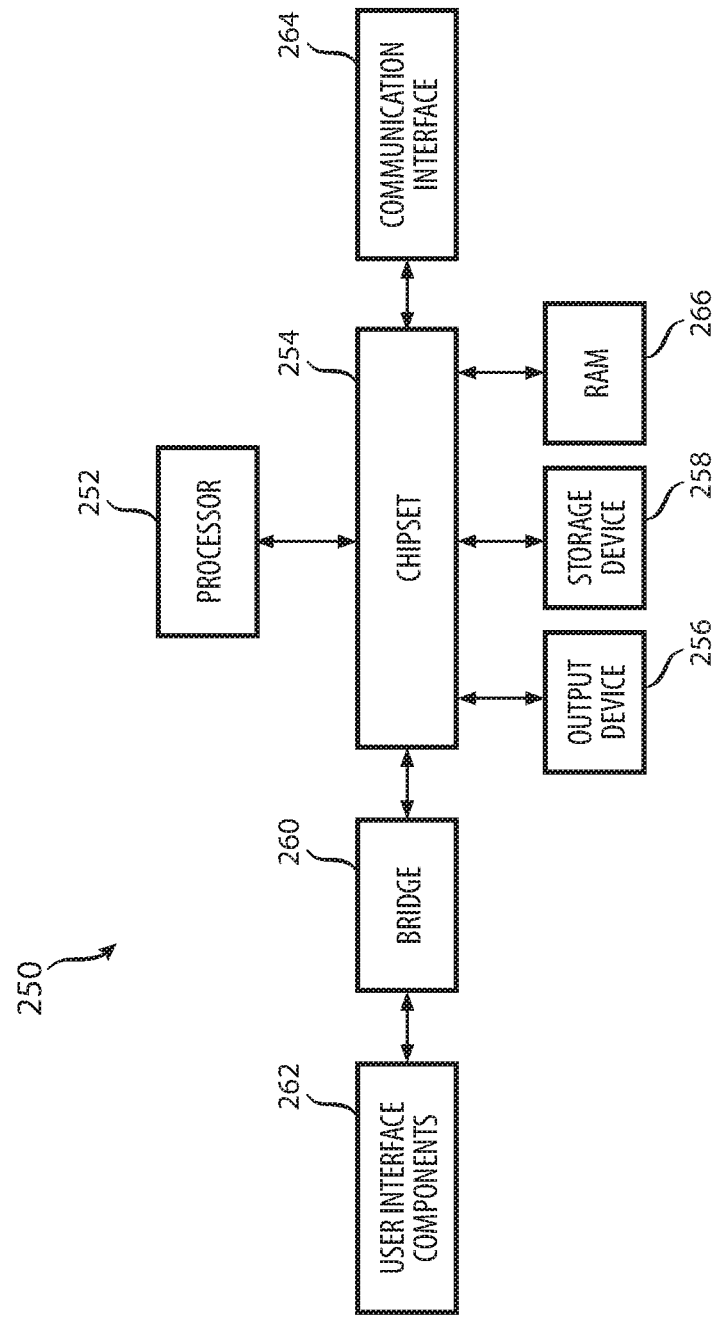

The disclosed technology addresses the need in the art for managing data centers. Disclosed are systems, methods, and computer-readable storage media for managing server racks using virtual rack management modules. A brief introductory description of exemplary systems and networks, as illustrated in FIGS. 1 and 2A-B, is disclosed herein. A detailed description of virtual rack management modules, related concepts, and exemplary variations, will then follow. These variations shall be described herein as the various embodiments are set forth.

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network. The disclosure now turns to FIG. 1.

FIG. 1 illustrates an exemplary computing device 100 suitable for implementing the present disclosure. Computing device 100 includes a master central processing unit (CPU) 102, interfaces 104, and a bus 106 (e.g., a PCI bus). When acting under the control of appropriate software or firmware, the CPU 102 is responsible for executing packet management, error detection, and/or routing functions, such as miscabling detection functions, for example. The CPU 102 preferably accomplishes all these functions under the control of software including an operating system and any appropriate applications software. CPU 102 may include one or more processors 110 such as a processor from the Motorola family of microprocessors or the MIPS family of microprocessors, or the ARM family of microprocessors. In an alternative embodiment, processor 110 is specially designed hardware for controlling the operations of computing device 100. In a specific embodiment, a memory 108 (such as non-volatile RAM and/or ROM) also forms part of CPU 102. However, there are many different ways in which memory could be coupled to the system.

The interfaces 104 are typically provided as interface cards (sometimes referred to as "line cards"). Generally, they control the sending and receiving of data packets over the network and sometimes support other peripherals used with the computing device 100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 102 to efficiently perform routing computations, network diagnostics, security functions, etc.

Although the system shown in FIG. 1 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with computing device 100.

Regardless of the network device's configuration, it may employ one or more memories or memory modules (including memory 108) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Computing device 100 can be any device that is capable of processing data communicated via a network. For example, computing device 100 can be a computer, a desktop computer, a mobile computing device, a server, a switch, a router, a gateway, a bridge, a media access controller, a virtual machine, a hypervisor, a Baseboard Management Controller (BMC) system, etc. The network can be a LAN, a WAN, etc.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible. System 200 of FIG. 2A and/or system 250 of FIG. 2B can be equivalent to system 100 of FIG. 1.

FIG. 2A illustrates a conventional system bus computing system architecture 200 wherein the components of the system are in electrical communication with each other using a bus 202. Exemplary system 200 includes a processing unit (CPU or processor) 204 and a system bus 202 that couples various system components including the system memory 206, such as read only memory (ROM) 208 and random access memory (RAM) 210, to the processor 204. The system 200 can include a cache of high-speed memory connected directly with, in close proximity to, or integrated as part of the processor 204. The system 200 can copy data from the memory 206 and/or the storage device 212 to the cache 214 for quick access by the processor 204. In this way, the cache can provide a performance boost that avoids processor 204 delays while waiting for data. These and other modules can control or be configured to control the processor 204 to perform various actions. Other system memory 206 may be available for use as well. The memory 206 can include multiple different types of memory with different performance characteristics. The processor 204 can include any general purpose processor and a hardware module or software module, such as module 1 (214), module 2 (216), and module 3 (218) stored in storage device 212, configured to control the processor 204 as well as a special-purpose processor where software instructions are incorporated into the actual processor design. The processor 204 may essentially be a completely self-contained computing system, containing multiple cores or processors, a bus, memory controller, cache, etc. A multi-core processor may be symmetric or asymmetric.

To enable user interaction with the computing device 200, an input device 220 can represent any number of input mechanisms, such as a microphone for speech, a touch-sensitive screen for gesture or graphical input, keyboard, mouse, motion input, speech and so forth. An output device 222 can also be one or more of a number of output mechanisms known to those of skill in the art. In some instances, multimodal systems can enable a user to provide multiple types of input to communicate with the computing device 200. The communications interface 224 can generally govern and manage the user input and system output. There is no restriction on operating on any particular hardware arrangement and therefore the basic features here may easily be substituted for improved hardware or firmware arrangements as they are developed.

Storage device 212 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 210, read only memory (ROM) 208, and hybrids thereof.

The storage device 212 can include software modules 214, 216, 218 for controlling the processor 204. Other hardware or software modules are contemplated. The storage device 212 can be connected to the system bus 202. In one aspect, a hardware module that performs a particular function can include the software component stored in a computer-readable medium or device in connection with the necessary hardware components, such as the processor 204, bus 202, display 222, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 252, representative of any number of physically and/or logically distinct resources capable of executing software, firmware, and hardware configured to perform identified computations. Processor 252 can communicate with a chipset 254 that can control input to and output from processor 252. In this example, chipset 254 outputs information to output device 256, such as a display, and can read and write information to storage device 258, which can include magnetic media, and solid state media, for example. Chipset 254 can also read data from and write data to RAM 266. A bridge 260 for interfacing with a variety of user interface components 262 can be provided for interfacing with chipset 254. Such user interface components 262 can include a keyboard, a microphone, touch detection and processing circuitry, a pointing device, such as a mouse, and so on. In general, inputs to system 250 can come from any of a variety of sources, machine generated and/or human generated.

Chipset 254 can also interface with one or more communication interfaces 264 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 252 analyzing data stored in storage 258 or 266. Further, the machine can receive inputs from a user via user interface components 262 and execute appropriate functions, such as browsing functions by interpreting these inputs using processor 252.

It can be appreciated that exemplary systems 200 and 250 can have more than one processor 204 or be part of a group or cluster of computing devices networked together to provide greater processing capability.

Figure 3:
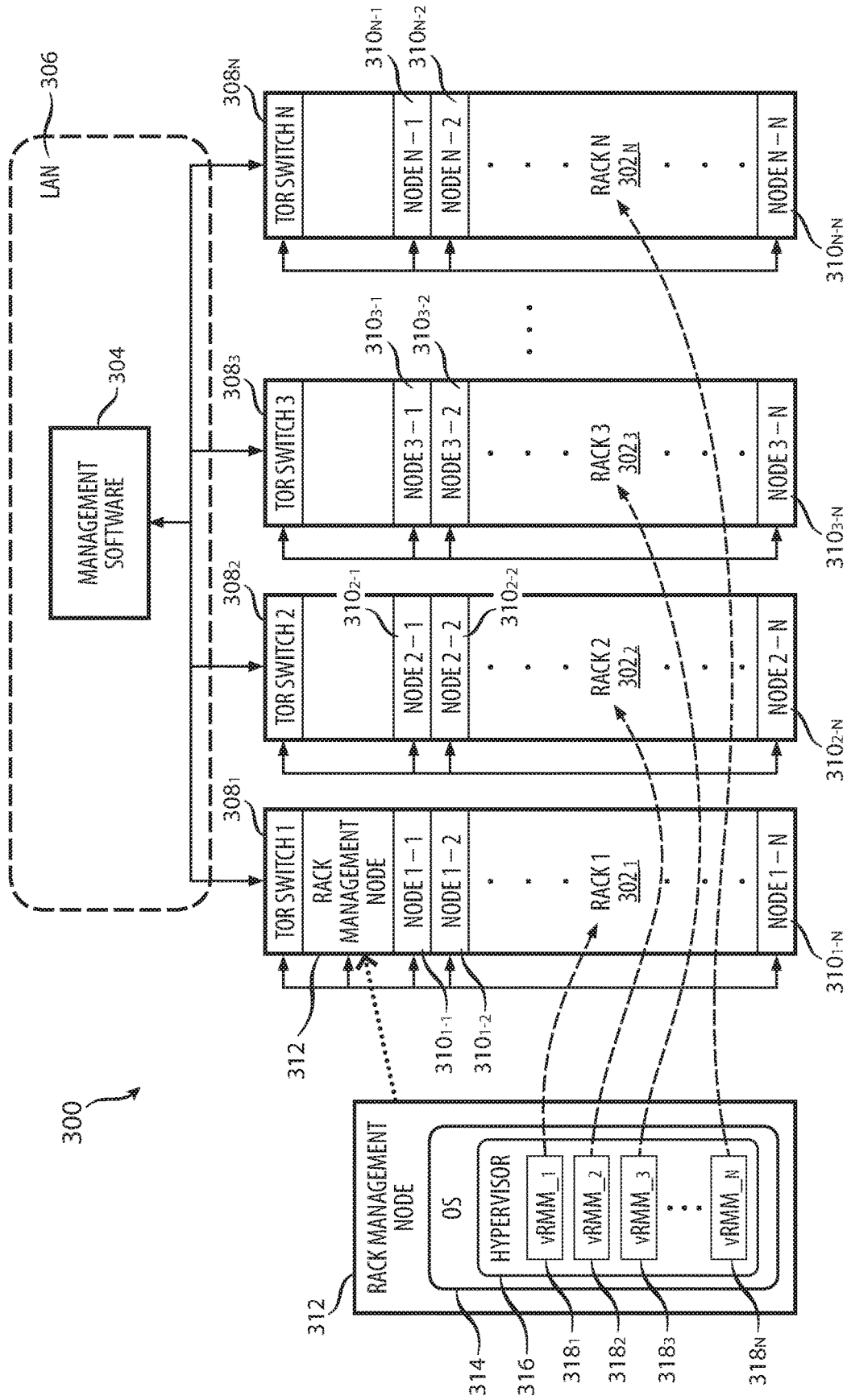
FIG. 3 shows an example data center architecture having virtual rack management modules.

FIG. 3 shows an example data center architecture having virtual rack management modules. Example data center 300 consists of one or more racks $302_1$, $302_2$, $302_3$, ..., $302_N$ (collectively "302") that are connected to management software 304 and/or other network nodes via a network. The network can be LAN 306 or any other type of network such as WAN, VXLAN, SONET, SDH, storage area network (SAN), optical lightpaths, etc. Management software 304 can be, for example, data center infrastructure management (DCIM) software that can manage physical and logical assets of a datacenter. Racks 302 can be physical frames, enclosures, or cabinets that are capable of housing various devices and equipment modules such as servers, switches, routers, gateways, storage, etc. The various devices and modules are also called rack-mounts, rack-mount instruments, rack mounted systems, etc, and can be physically mounted on racks 302 via screws or other fastening means.

In this example, rack 1 ($302_1$) has top-of-rack (ToR) switch 1 ($308_1$) and node 1-1 ($310_{1-1}$) through node 1-N ($310_{1-N}$) installed or mounted in it. Similarly, ToR switch 2 ($308_2$) and nodes 2-1 through 2-N ($310_{2-1}$, $310_{2-2}$, ..., $310_{2-N}$) are installed in rack 2 ($302_2$); ToR switch 3 ($308_3$) and nodes 3-1 through 3-N ($310_{3-1}$, $310_{3-2}$, ..., $310_{3-N}$) are installed in rack 3 ($302_3$); and ToR switch N ($308_N$) and nodes N-1 through N-N ($310_{N-1}$, $310_{N-2}$, ..., $310_{N-N}$) are installed in rack N ($302_N$). One of ordinary skill in the art will recognize that there can be any number of racks and each of the racks can have zero or more nodes installed in it. Racks 302 do not all need to have the same number of nodes in them. A ToR switch, such as switches $308_1$, $308_2$, $308_3$, ..., $308_N$ (collectively "308"), is a switch, such as an Ethernet switch, that is installed inside a rack and connects to every node in that rack via network cables. However, ToR switches 308 do not need to be physically at the top of the rack as long as they are connected to most or all nodes in the rack. Thus, nodes 1-1 through 1-N are connected to ToR switch 1 ($308_1$) and communicate with the rest of the network through ToR switch 1 ($308_1$). Similarly, nodes 2-1 through 2-N may communicate with LAN 306 and other networks through ToR switch 2 ($308_2$), etc. Moreover ToR switches 308 can have their own Internet Protocol (IP) addresses and also may maintain the list of all the individual addresses, such as IP addresses and BMC IP addresses, as well as locations for all the nodes in their respective racks. For example, ToR switch 3 ($308_3$) can keep track of all the IP addresses, BMC IP addresses, and locations (e.g., slot numbers within rack 3 ($302_3$)) for nodes 3-1 through 3-N ($302_{3-1}$, $302_{3-2}$, ... $302_{3-N}$).

A rack management module (RMM) can be a computer, system-on-chip (SoC), or computer-on-module (CoM) that is installed on or near a ToR switch and typically inside a rack. For example, an RMM can execute built-in management services on a Linux®-based operating system running on an x86 processor-based computer. The RMM can retrieve, from the ToR switch, BMC IP addresses for the nodes in the rack and monitor each node by using the BMC IP addresses. Typically, each rack has its own RMM and management software 304 can monitor and manage the RMMs. However, since each RMM requires an additional power source, space, and cabling in the rack, having an RMM in each rack increases cost and complexity of the data center architecture.

In example data center 300, however, instead of installing individual RMMs in every rack 302, one rack management node 312 can be installed in only one of the racks such as rack 1 ($302_1$). One of ordinarily skill in the art will understand that rack management node 312 can also be in a separate location outside racks 302. Rack management node 312 can be, for example, a standard rack mount server. Furthermore, rack management node 312 can run operating system 314 such as a Linux®- or Unix®-based operating system. Rack management node 312 can also have hypervisor 316 running one or more virtual machines (VMs). Each of those VMs can be based on a virtualized version of an RMM. Thus, hypervisor 316 can run one or more images of virtual rack management modules (vRMMs) such as vRMM_1 ($318_1$), vRMM_2 ($318_2$), vRMM_3 ($318_3$), ..., vRMM_N ($318_N$) (collectively "318"). vRMMs 318 can be virtualized versions of a physical RMM and each be assigned or registered to one of racks 302. In this example, vRMM_1 ($318_1$) is registered to rack 1 ($302_1$), vRMM_2 ($318_2$) is registered to rack 2 ($302_2$), vRMM_3 ($318_3$) is registered to rack 3 ($302_3$), ..., and vRMM_N ($318_N$) is registered to rack N ($302_N$). vRMMs 318 can be based on the same image of an RMM or they can be based on two or more disparate images. In other words, vRMMs 318 can be associated with different guest operating systems, different applications, different drivers, different services, etc.

When one or more vRMMs 318 get instantiated and come online, management software 304, rack management node 312, or the individual vRMMs can check to see whether any of racks 302 is yet to be registered, and if an unregistered rack is discovered, register itself to the unregistered rack and start managing the newly registered rack. Thus, for example, vRMM_2 (318$_2$) can discover an unregistered rack, such as rack 2 (302$_2$), and communicate with its ToR switch 308$_2$ to retrieve information about its nodes 310$_{2-1}$, 310$_{2-2}$, . . . , 310$_{2-N}$, such as their IP addresses, BMC IP addresses, locations, etc. Once vRMM_2 (318$_2$) retrieves all the necessary information from ToR switch 2 (308$_2$), vRMM_2 (318$_2$) can start managing the nodes in rack 2 (302$_2$). Thus, when a data center gets a new rack of nodes instantiated, rack management node 312 can simply assign one of its idle vRMMs (318) to the new rack or instantiate a new VM with a vRMM image for the new rack. No further modification to management software 304 or any of the existing vRMM images would be necessary.

FIG. 4 shows an example mapping table for rack management modules. Table 400 may represent an example list or data structure that is stored inside a node, a rack, a ToR switch, a rack management node, a hypervisor, a vRMM, and/or management software. Table 400 can have columns such as ToR switch 402, address 404, vRMM 406, etc. For example, exemplary table 400 shows that ToR switch 1 has the IP address of 192.168.1.1 and is registered to vRMM 1. Table 400 also shows, for example, ToR switch 3 having the IP address of 192.168.1.15 and not yet being registered to any vRMMs. When a new vRMM is instantiated or an existing vRMM unregisters from a previous ToR switch, the vRMM can look up table 400 to discover an unregistered ToR switch such as ToR switch 3 or ToR switch 5. If the information about vRMM registration statuses 406 is not available, the new vRMM can also send registration requests to each of the addresses 404, one address at a time, until one of the corresponding ToR switches returns a message indicating that the switch is unregistered. Once an unregistered ToR switch (and thus the unregistered rack) is discovered, the vRMM can register itself with the unregistered ToR switch (and its unregistered rack) and update table 400 by marking the ToR switch as being registered.

FIG. 5 shows an example table for rack management information. Table 500 may represent an example list or data structure that is retrieved by a vRMM from a corresponding ToR switch. For example, once a vRMM is registered to a ToR switch (and its corresponding rack of nodes), the vRMM can retrieve information about the nodes that are installed in the same rack as the ToR switch. That information, to be used for rack management, can include node identifiers 502, IP addresses 504, BMC IP addresses 506, locations 508, etc. Node identifiers 502 may be numbers or alphanumeric strings that uniquely identify nodes that are mounted on a given server rack. Nodes can be computers, servers, VMs, switches, routers, gateways, network devices, etc. Host/Node IP addresses 504 can be associated with nodes and the vRMM can use IP addresses 504 to communicate with the corresponding nodes. BMC IP addresses 506 may be used to reach the corresponding nodes via side-band or out-of-band channels. These communication channels may be separate dedicated management LAN connections, for example, in accordance with the Intelligent Platform Management Interface (IPMI). BMC IP addresses 506 can be assigned to individual BMC modules that are embedded inside the nodes and can allow vRMM and/or management software to monitor the status of the nodes even when the nodes are offline or out of order. Locations 508 may represent the individual nodes' locations within the rack. For example, locations 508 can represent the mount or slot number of a node within the rack.

Having disclosed some basic system components and concepts, the disclosure now turns to the exemplary method embodiment shown in FIG. 6. For the sake of clarity, the method is described in terms of system 100, as shown in FIG. 1, configured to practice the method. However, the example method can be practiced by any software or hardware components, devices, etc. heretofore disclosed, such as system 200 of FIG. 2A, system 250 of FIG. 2B, data center 300 of FIG. 3, management software 304 of FIG. 3, rack management node 312 of FIG. 3, hypervisor 316 of FIG. 3, vRMM 318 of FIG. 3, etc. The steps outlined herein are exemplary and can be implemented in any combination thereof in any order, including combinations that exclude, add, or modify certain steps.

FIG. 6 shows an example method embodiment for registering a virtual rack management module. System 100 can execute a virtual rack management module image on a hypervisor (602). The hypervisor can be executing on a rack management node installed in a rack. The rack management node can be a rack mount server. System 100 can identify a list of addresses, where each address in the list of addresses is assigned to a respective top-of-rack switch (604). System 100 can send a registration request to each address in the list of addresses until an acknowledgement is received from an unregistered top-of-rack switch (606). The acknowledgement may be sent by the unregistered top-of-rack switch in response to one of the registration requests. For example, system 100 can send out registration requests to each of the addresses in the list, one request at a time, and when an unregistered top-of-rack switch receives one of these requests, it can send back an acknowledgement to system 100. The acknowledgement could indicate the identity of the unregistered top-of-rack switch. Alternatively, system 100 can discover an unregistered top-of-rack switch by looking up in a mapping table that maps top-of-rack switches with virtual rack management module images.

System 100 can register the virtual rack management module image with the unregistered top-of-rack switch to yield a registered top-of-rack switch, wherein the registered top-of-rack switch is associated with a group of nodes installed in a rack (608). The rack could be same rack where the rack management node installed or it could be a different rack. The group of nodes can include a server, a computer, and/or a network device. The registered top-of-rack switch may be installed in the same rack as the group of nodes. Registering the virtual rack management module image may include receiving node addresses from the unregistered top-of-rack switch. Each node address of the node addresses may correspond to a respective node of the group of nodes. The node addresses can be baseboard management controller IP addresses. Registering the virtual rack management module image may also include receiving locations from the unregistered top-of-rack switch, each location of the locations corresponding to a respective location, within the rack, of a respective node of the group nodes. The registered top-of-rack switch can be marked in the list of addresses as being registered. The virtual rack management module image can then manage the group of nodes (610).

System 100 may also execute a second virtual rack management module image on the hypervisor. System 100 can send a second registration request to each address in the list of addresses until a second acknowledgement is received from a second unregistered top-of-rack switch. System 100 can register the second virtual rack management module image with the second unregistered top-of-rack switch to yield a second registered top-of-rack switch. The second registered top-of-rack switch can be associated with a second group of nodes installed in a second rack. The second virtual rack management module image can then manage the second group of nodes.

For clarity of explanation, in some instances the present technology may be presented as including individual functional blocks including functional blocks comprising devices, device components, steps or routines in a method embodied in software, or combinations of hardware and software. Computer-readable storage devices and media expressly exclude transitory media such as energy, carrier signals, electromagnetic waves, and signals per se.

Methods according to the above-described examples can be implemented using computer-executable instructions that are stored or otherwise available from computer readable media or devices. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A system comprising:
    a first rack comprising a first top-of-rack switch and a first group of nodes, the first top-of-rack switch being connected to the first group of nodes via a network;
    a second rack comprising a second top-of-rack switch and a second group of nodes, the second top-of-rack switch being connected to the second group of nodes via the network, and the second top-of-rack switch being connected to the first top-of-rack switch via the network; and
    a rack management node executing a hypervisor, wherein the rack management node is mounted on the first rack, wherein the hypervisor runs a first virtual rack management module and a second virtual rack management module,
    wherein the first and second virtual rack management modules are operable to:
        identify a list of addresses, each address in the list of addresses being assigned to the respective top-of-rack switch;
        send a registration request to the each address in the list of addresses until an acknowledgement is received from the unregistered top-of-rack switch;
        register the first or second virtual rack management module with the respective unregistered top-of-rack switch to yield a registered top-of-rack switch, wherein the registered top-of-rack switch is associated with the group of nodes installed in the respective first or second rack, and wherein the first virtual rack management module manages and monitors each of the first group of nodes of the first rack, and the second virtual rack management module manages and monitors each of the second group of nodes of the second rack via the first top-of-rack switch of the first rack and the second top-of-rack switch of the second rack.

2. The system of claim 1, wherein the second rack lacks any rack management module that is physically mounted on the second rack.

3. The system of claim 1, wherein the rack management node comprises a rack mount server.

4. The system of claim 1, wherein the hypervisor runs three or more virtual rack management modules, each of the three or more virtual rack management module managing a respective group of nodes installed in a respective rack.

5. The system of claim 1, wherein the first virtual rack management module is configured to retrieve a list of Internet protocol (IP) addresses from the first top-of-rack switch, each IP address in the list of IP addresses being associated with a corresponding node in the first group of nodes.

6. The system of claim 5, wherein each of the IP addresses comprises a baseboard management controller IP address.

7. The system of claim 1, wherein the first virtual rack management module is configured to retrieve a list of locations from the first top-of-rack switch, each location in the list of locations being associated with a corresponding node in the first group of nodes.

8. The system of claim 1, wherein the first group of nodes and the second group of nodes comprise at least one of a server, a computer, or a network device.

9. The system of claim 1, further comprising:
a list of mappings between virtual rack management modules, running on the hypervisor, and groups of nodes, wherein the first virtual rack management module and the second virtual rack management module are configured to retrieve and update the list of mappings.

10. A method comprising:
executing a virtual rack management module image on a hypervisor;
identifying a list of addresses, each address in the list of addresses being assigned to a respective top-of-rack switch;
sending a registration request to the each address in the list of addresses until an acknowledgement is received from an unregistered top-of-rack switch;
registering the virtual rack management module image with the unregistered top-of-rack switch to yield a registered top-of-rack switch, wherein the registered top-of-rack switch is associated with a group of nodes installed in a rack; and
managing the group of nodes by the virtual rack management module image.

11. The system of claim 1, wherein the first virtual rack management module includes a first guest operating system and wherein the second virtual rack management module includes a second different guest operating system.

12. A method comprising:
connecting a first group of nodes via a network to a first top-of-rack switch, wherein the first group of nodes and the first top-of-rack switch are in a first rack;
connecting a second group of nodes via the network to a second top-of-rack switch, wherein the second group of nodes and the second top-of-rack switch are in a second rack;
connecting the second top-of-rack switch to the first top-of-rack switch via the network;
executing a first virtual rack management module and a second virtual rack management module on a hypervisor executed on a rack management module mounted on the first rack;
identifying a list of addresses, each address in the list of addresses being assigned to the respective first or second top-of-rack switch;
sending a registration request to the each address in the list of addresses until an acknowledgement is received from an unregistered first or second top-of-rack switch;
registering the first or second virtual rack management module with the unregistered first or second top-of-rack switch to yield a registered first or second top-of-rack switch, wherein the registered first or second top-of-rack switch is associated with the first or second group of nodes installed in the first or second rack;
managing and monitoring the first group of nodes by the first virtual rack management module; and
managing and monitoring the second group of nodes by the second virtual rack management module.

13. The method of claim 12, wherein registering the virtual rack management modules comprises receiving node addresses from the unregistered top-of-rack switch, each node address of the node addresses corresponding to a respective node of the first or second group of nodes.

14. The method of claim 13, wherein the node addresses comprise baseboard management controller IP addresses.

15. The method of claim 12, wherein registering the virtual rack management module image comprises receiving locations from the unregistered first or second top-of-rack switch, each location of the locations corresponding to a respective location, within the rack, of a respective node of the first or second group of nodes.

16. The method of claim 12, further comprising marking the registered first or second top-of-rack switch as being registered in the list of addresses.

17. The method of claim 12, wherein the rack management node is a rack mount server.

18. The method of claim 12, wherein the first and second group of nodes comprise at least one of a server, a computer, or a network device.

19. A computer-readable storage device storing instructions which, when executed by a processor, cause the processor to perform operations comprising:
connecting a first group of nodes via a network to a first top-of-rack switch, wherein the first group of nodes and the first top-of-rack switch are in a first rack;
connecting a second group of nodes via the network to a second top-of-rack switch, wherein the second group of nodes and the second top-of-rack switch are in a second rack;
connecting the second top-of-rack switch to the first top-of-rack switch via the network;
executing a first virtual rack management module and a second virtual rack management module on a hypervisor executed on a rack management module mounted on the first rack;
identifying a list of addresses, each address in the list of addresses being assigned to the respective first or second top-of-rack switch;

sending a registration request to the each address in the list of addresses until an acknowledgement is received from an unregistered first or second top-of-rack switch;
registering the first or second virtual rack management module with the unregistered first or second top-of-rack switch to yield a registered first or second top-of-rack switch, wherein the registered first or second top-of-rack switch is associated with the first or second group of nodes installed in the first or second rack;
managing and monitoring the first group of nodes by the first virtual rack management module; and
managing and monitoring the second group of nodes by the second virtual rack management module.

\* \* \* \* \*